UNITED STATES PATENT OFFICE.

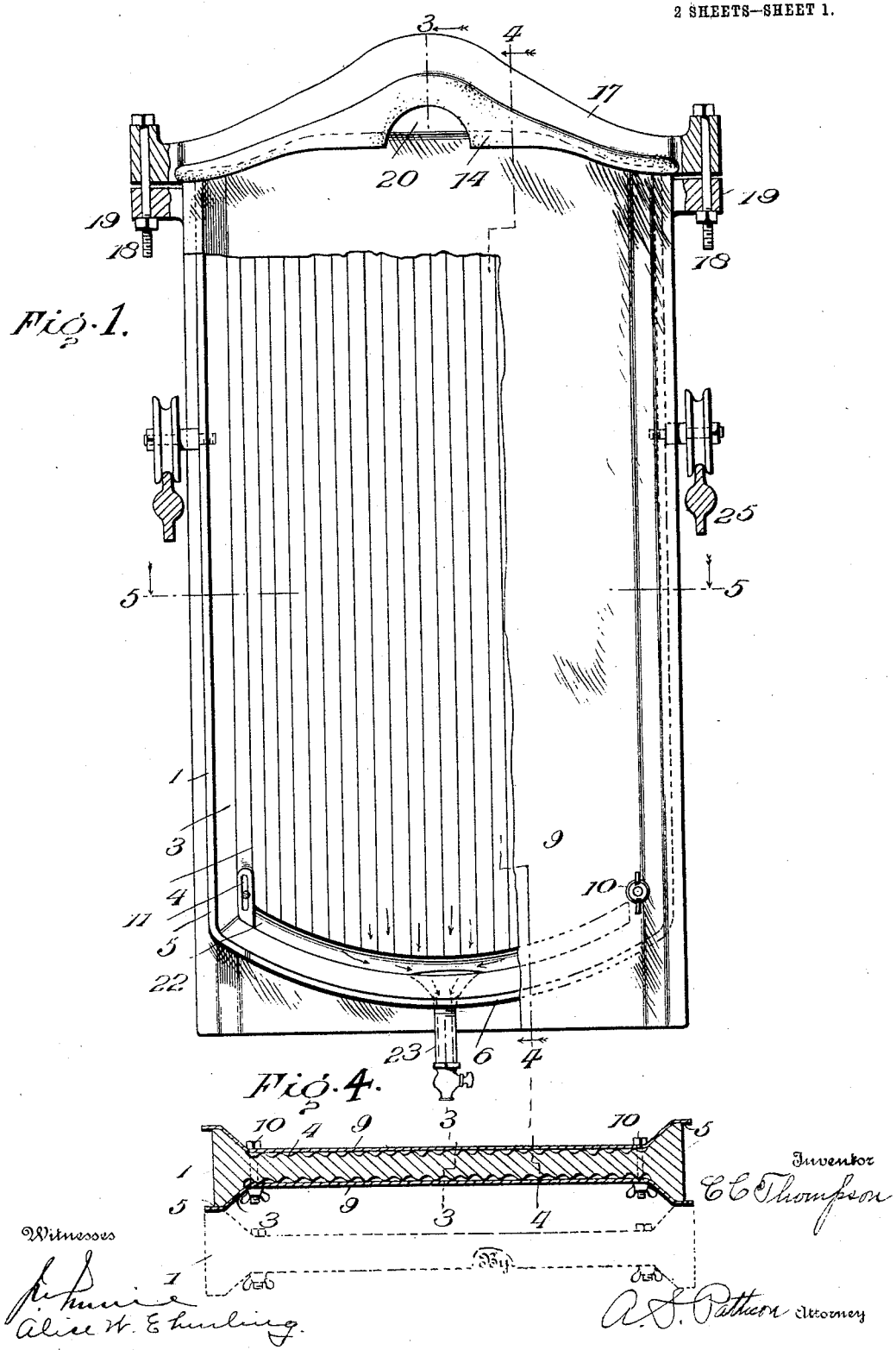

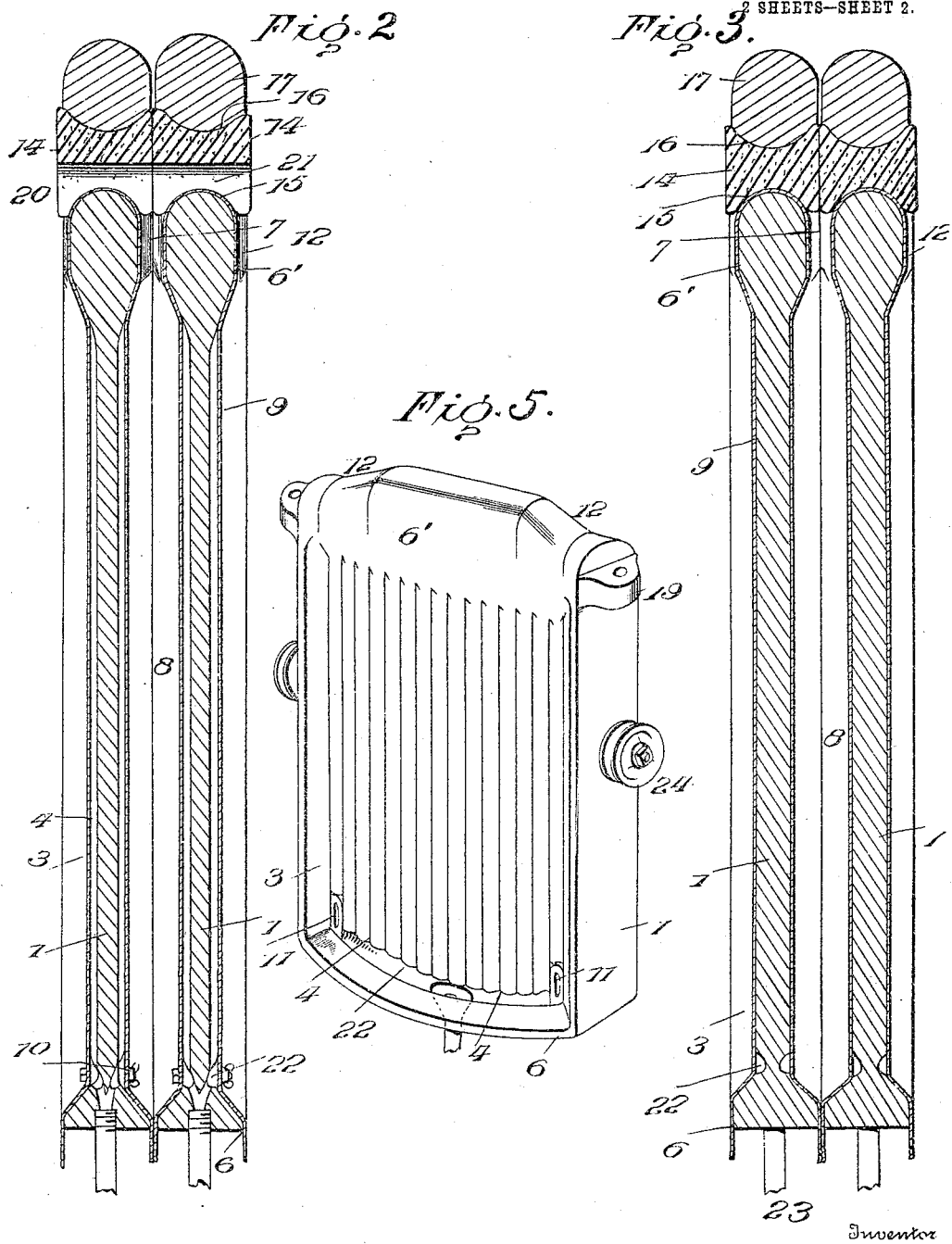

CASSIUS C. THOMPSON, OF EAST LIVERPOOL, OHIO.

PRESS-FILTER.

No. 799,417.  Specification of Letters Patent.  Patented Sept. 12, 1905.

Application filed December 7, 1904. Serial No. 235,857.

*To all whom it may concern:*

Be it known that I, CASSIUS C. THOMPSON, a citizen of the United States, residing at East Liverpool, in the county of Columbiana and State of Ohio, have invented certain new and useful Improvements in Press-Filters, of which the following is a specification, reference being had therein to the accompanying drawings.

This invention relates to improvements in press-filters, and pertains to that class of press-filters in which separate leaves or sections are utilized for supporting the filtering-cloth, the said sections being held together under pressure.

My present invention relates to certain improvements upon this class of press-filters by means of which certain advantages are obtained and an improved press-filter produced.

One of the features of my present invention pertains to an improved construction of the separate leaves or sections whereby I can use a continuous filtering cloth or material, which extends along both sides of the leaves and across the upper edge thereof.

Another feature of my present invention pertains to the manner of clamping the continuous sheet of filtering-cloth to each of the leaves or sections of the filter.

Another feature of my present invention pertains to means for making a water-tight joint at the upper adjacent edges of the several leaves or sections and to so construct this joint that a supply passage-way is provided having communication with the spaces between the several sections whereby the fluid to be filtered is forced under pressure to the spaces between the sections or leaves.

Another feature of my present invention pertains to the specific construction of the leaves or sections whereby certain improved results are accomplished.

My present invention also pertains to other details of construction, which will be fully described hereinafter and particularly pointed out in the claims.

In the accompanying drawings, Figure 1 is a longitudinal vertical sectional view through my improved press-filter between two of the leaves or sections and showing the filtering-cloth partly broken away. Fig. 2 is a transverse vertical sectional view taken on the line 3 3 of Fig. 1. Fig. 3 is a vertical transverse sectional view taken on the line 4 4 of Fig. 1. Fig. 4 is a transverse horizontal sectional view of one of the leaves or sections, taken on the line 5 5 of Fig. 1. Fig. 5 is a detached perspective view of one of the said leaves or sections.

My improved filter consists in providing a suitable number of vertically-arranged leaves or sections 1. These several sections or leaves are arranged together side by side when in use, as illustrated in Figs. 2 and 3. Preferably these sections are elongated vertically, though their height may be varied without departing from the spirit and scope of my invention, as will more fully appear hereinafter.

Each section or leaf of my improved filter consists of a member 2, which is recessed at opposites sides, as shown at 3, and the surface of these recesses are provided with a plurality of longitudinally-arranged grooves 4. The recesses form side edges 5 and a lower edge 6. These vertical sides and lower edges are adapted to fit closely against the corresponding vertical and lower edges of the adjacent sections with the cloth between them when they are placed together, as shown in Figs. 2 and 3. At their upper ends these sections are recessed between their edges, as shown at 6', to form the passage-way 7. As shown in Fig. 2, the recesses 3 form the spaces 8, in which spaces the material which has been filtered from the liquid is retained and can be moved therefrom by separating the several sections of the filter.

As stated in the beginning of this description, one of the features of my present invention is the capability of using a continuous sheet of filtering-cloth. This filtering-cloth is indicated in the drawings by 9, and as there shown extends over the upper edge of each section and down the opposite sides thereof and rests against the projections which form the grooves 4 on opposite sides or faces of the several sections. The lower corners of this filtering-cloth are provided with eyelets, which are adapted to engage the bolts 10, and these bolts are capable of longitudinal and vertical adjustment in suitable slots 11, formed in the leaves or sections. This longitudinal adjustment provides for any contraction of the cloth arising in the use thereof.

To enable the filtering-cloth to closely fit the recessed faces or sides of the leaves or sections, the upper edges or ends of each section are curved downward slightly, as shown at 12. This peculiar construction of the upper end of the sections enables the filtering-cloth to closely fit against the opposite grooved faces of each section. To form a tight joint at the upper ends of these sections and also to form an inlet passage-way for the liquid to be filtered, I provide flexible members 14, preferably made of rubber. There is one of these rubber members or sections for each section or leaf, and the lower edges of these rubber members 14 are grooved, as shown at 15, to fit the upper rounded edge of the leaf or sections. Also the outer edge of the rubber section 14 is grooved, as shown at 16, to receive a clamping member 17. The clamping member 17 is placed in this groove and, as shown in Fig. 1, extends across the filter and is clamped thereto through the medium of bolts 18, passing through the ends of the clamping member and through suitable ears 19, extending laterally from the upper ends of the several leaves or sections 1.

Formed at the center of the rubber sections 14 is a groove 20, which constitutes, when the rubber sections are placed together, as shown in Fig. 2, a passage-way 21. This passage-way 21 communicates with all of the passage-ways 7, so that the liquid to be filtered is forced into the passage-way 21 and flows therefrom into the spaces 8. The pressure under which the liquid is subjected, as is well known in this class of filters, forces the water through the filtering-cloths 9 into the grooves 4, and this water passes down the grooves into a suitable recess or chamber 22, formed at the lower edge or near the lower end of each section and communicates with the said grooves. From this chamber the water passes out through a suitable outlet-pipe 23, of which there is one for each section or leaf 1.

Projecting from opposite sides of the sections or leaves are suitable supporting members 24. These supporting members 24 rest upon a suitable supporting-frame 25, in which the several sections are placed and compressed in the usual way. These sections being arranged as hereinbefore described and illustrated and being pressed tightly together, the filtering-cloth makes a tight joint at the vertical parallel edges of the sections and also at the bottom, while the rubber members 14 make a tight connection at the upper ends of these several sections.

While this apparatus is adapted to filter any kind of material, it is well adapted for filtering mixed clay. As is understood by those skilled in this art, and especially for pottery-work, the clay is mixed with water to a thin consistency to about like cream. This creamy mixture is forced into the passage-way 21 and is under considerable pressure and flows into the several spaces 8, and, as aforestated, the pressure then forces the water through the cloth into the grooves, from the grooves into the outlet chambers or recesses 22, from which the water is then allowed to pass and may be conveyed to any suitable point.

By using a continuous strip of filtering-cloth I am enabled to cut from a sheet or bundle of filtering-cloth a strip of the necessary length and width and place it over the sections and hook it or secure it at its lower corners without the necessity of any previous treatment in the way of making it into bags, which is quite common in press-filters. This simple arrangement is found convenient in operation, and when combined with the construction hereinbefore described produces a press-filter which is exceedingly efficient in its work.

By making the filtering-cloth continuous, as here shown, and at the inlet ends of the spaces between the sections it will be seen that an absolutely tight joint is made at this point, so that there can be no escape of unfiltered material.

Having thus described my invention, what I claim, and desire to secure by Letters Patent, is—

1. An improved leaf or section for press-filters adapted to receive a continuous strip of filtering-cloth, the said section provided with a recessed surface surrounded by straight projecting edges at two sides and one end, and the opposite end concaved to form a passage-way to the said recessed face, and compressible members engaging this end of the said section for making a tight joint.

2. An improved press-filter comprising a plurality of leaves or sections, each leaf or section having a grooved recessed face, a filtering-cloth at each side of the section engaging the projections of the grooves and the edges formed by the recess and clamped between the sections, a compressible member engaging one edge of the leaf, means for compressing the members to make a tight joint, the edges of the plate adjacent the compressible members being cut away to form a passage-way in communication with the space formed by the recesses of the sections, the said compressible member having an inlet passage-way in communication with the aforesaid passage-way, and an outlet passage-way in communication with the said grooves behind the filtering-cloth.

3. An improved leaf or section for press-filters, comprising a section having opposite recessed grooved surfaces, one edge of the member being curved and widened at its ends, and a filtering-cloth passed around the said edge and along opposite sides of the grooved surfaces, said shape causing the cloth to properly fit the recessed portions of the sections, the edges of the cloth being adapted to be clamped between the edges of the sections, and means for closing the upper end of the sections, and an inlet passage-way in communication with the spaces between the sections.

4. An improved filter-press, comprising a plurality of sections having sides provided with grooved recesses, a filtering-cloth passing around each of the sections, the upper end of said sections cut away and forming elongated openings extending across the entire upper end of the sections and communicating with said grooved recesses, and hollow members clamped to the upper end of said sections and closing the openings between said members.

5. An improved filter-press, comprising a plurality of sections having sides provided with grooved recesses, a filtering-cloth passing around each section, the upper ends of said sections cut away and forming elongated openings extending across the entire upper end of the sections and communicating with the said grooved recesses, and hollow expansible members extending across said sections and closing the elongated openings and said members communicating with each other.

6. An improved filter-press, comprising a plurality of sections having sides provided with grooved recesses, a filtering-cloth passing around each section, the upper ends of said sections cut away and forming elongated openings extending across the entire upper end of the sections and communicating with said grooved recesses, and hollow expansible members extending across said sections and independently removably held upon said sections and in communication with said elongated openings and said members communicating with each other.

7. An improved filter-press, comprising a plurality of sections having sides provided with grooved recesses, a filtering-cloth passing around each section, the upper ends of said sections cut away forming elongated openings extending across the entire upper ends of the sections, and communicating with the grooved recesses, and hollow expansible members extending across said sections and in communication with said elongated openings and said members communicating with each other, and bolts independently and removably clamping said members to their respective sections.

8. An improved filter-press, comprising a plurality of sections having sides provided with grooved recesses, a filtering-cloth covering said recesses and hollow members closing the upper ends of said sections and independently removably bolted to their respective sections, and said hollow members communicating with each other.

9. An improved filter-press, comprising a plurality of sections having sides provided with grooved recesses, a filtering-cloth covering said recesses and hollow expansible members closing the upper ends of said sections and independently removably bolted to their respective sections and forming a tight connection between the same and the section and between each other, and said hollow members in communication with each other.

10. An improved filter-press, comprising a plurality of sections having sides provided with grooved recesses, a filtering-cloth covering said recesses, lugs carried by the edges of said sections, hollow expansible members closing the upper ends of said sections and having outwardly-extending lugs corresponding with the lugs of the sections, bolts passing through the lugs of the sections and the lugs of the expansible hollow members and independently removably securing the same to their respective sections, and said members forming a tight connection between the same and the sections and each other, and said members being in communication with each other.

In testimony whereof I affix my signature in presence of two witnesses.

CASSIUS C. THOMPSON.

Witnesses:
A. S. PATTISON,
G. M. BOND.